Jan. 18, 1927.
A. J. MACY
1,614,748
ADVERTISING DISPLAY
Filed Sept. 6, 1924
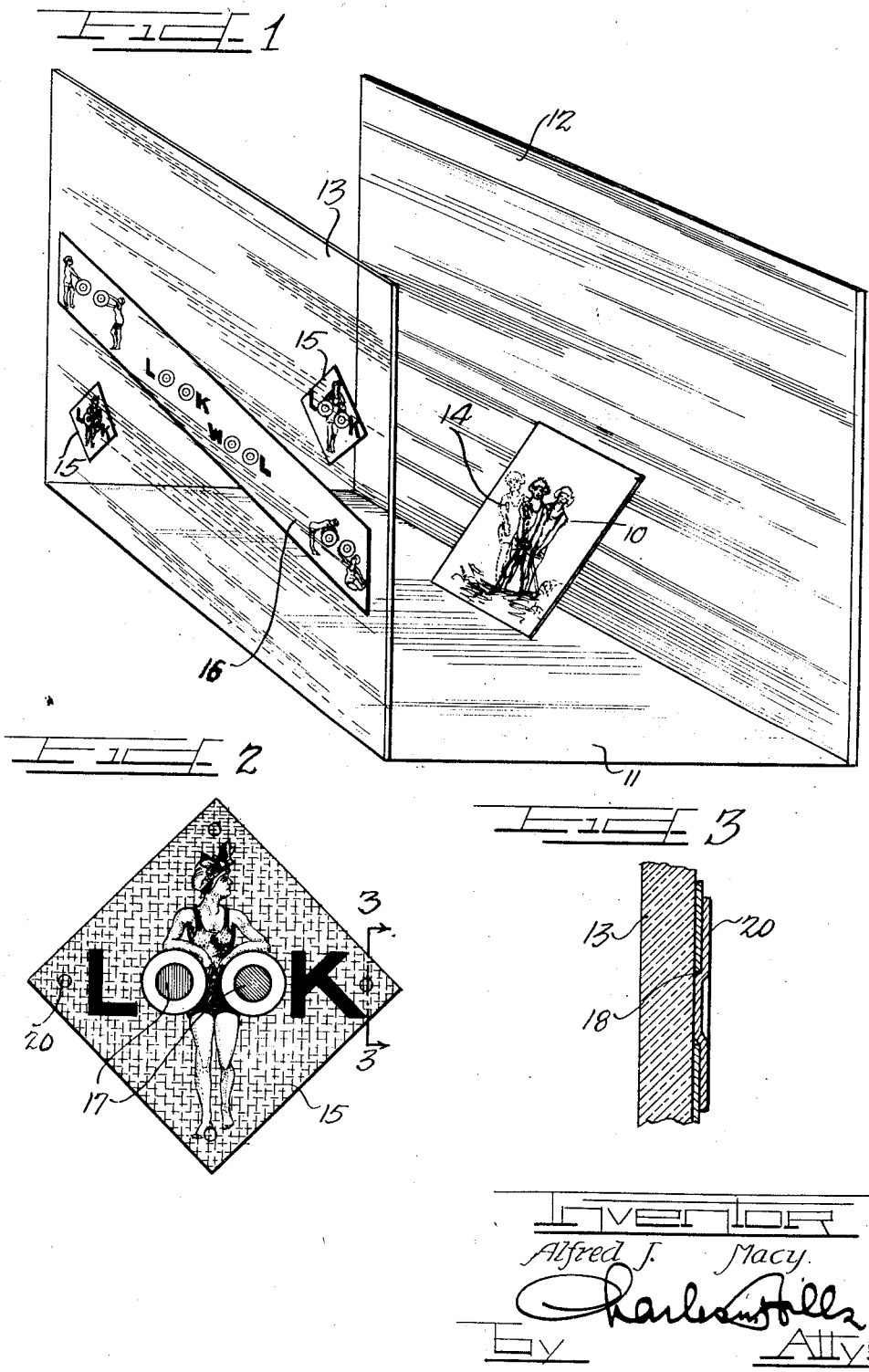
Inventor
Alfred J. Macy.

Patented Jan. 18, 1927.

1,614,748

UNITED STATES PATENT OFFICE.

ALFRED J. MACY, OF CHICAGO, ILLINOIS, ASSIGNOR TO MACY ART PROCESS CORPORATION, OF CHICAGO, ILLINOIS, A CORPORATION OF ILLINOIS.

ADVERTISING DISPLAY.

Application filed September 6, 1924. Serial No. 736,270.

This invention relates to means for displaying stereoscopic illustrations of the type requiring special color-screens or eyeglasses to bring out the stereoscopic effect of the illustrations.

The annual expenditures on window displays and kindred advertising runs into millions of dollars, a large part of which is wasted by reason of the fact that ordinary displays fail to reach out and seize the attention of the passer-by unless his mind is in a receptive mood for the particular articles advertised. Therefore, it has heretofore been found impractical and expensive from an advertising standpoint to rely merely on illustrations for show window display. Such illustrations are so unattractive to the general public that window stickers such as copies of newspaper advertisements are resorted to put over the idea of the articles on sale. Such methods are also unsatisfactory because the average passer-by reads as he runs and overlooks the interior display while reading the window stickers. A highly satisfactory, but prohibitively expensive method of window display, except for the largest stores, is to use a live model to demonstrate the products on display.

An important object of my invention is to provide combined primary and secondary advertising media in which the secondary medium contains an indicia or advertisement closely related to the primary and as well serves to pique at curiosity of the public so that they will be forcibly attracted to view the primary advertising medium through the color-screens which form a part of or are related to the secondary medium. Experience has demostrated that where this method of presenting window displays is used that such displays are much more attractive and attention-compelling than even the use of a living figure for show window display purposes and where the two methods have been used side by side it has been found that a greater advertising value is derived from this process than the old process, even where the more expensive living model or demonstrator has been used in the show window.

It is an object of this invention to provide a scheme for attractively displaying stereograms by providing suitable color-screens conveniently arranged to invite passers-by to gaze therethrough, as in the case of show window exhibits and the like. By rendering the surface surrounding the eye-screens as attractive and attention-compelling as possible, observers will move up to the color-screens and therefore be in a position for correctly viewing the stereogram on display.

It is also an object of this invention to provide color-screen posters bearing display media calculated to augment as well as attract attention to the interior display. The psychological effects of such dramatic window posters are to entice the passer-by to give his undivided attention to the poster first and thence to the interior of the show window, as viewed through the color-screens.

It is therefore an object of this invention to provide a color-screen having a forceful secondary display value serving as a medium for actual advertising in itself which shall attract the attention of the passer-by and by compelling suggestion invite the close inspection of the primary display in the show window as will forcefully suggest to the passer-by the fact that the window display which he will see if he uses the associated color-screens, will be intimately related to the subject matter of the advertising medium in the secondary display.

Other and further important objects of this invention will be apparent from the disclosures in the specification and the accompanying drawings.

The invention (in a preferred form) is illustrated in the drawings and hereinafter more fully described.

On the drawings:

Figure 1 is a perspective view of a portion of a show window with a display embodying features of this invention arranged therein.

Figure 2 is an enlarged view of a specific example of an eye-shield.

Figure 3 is an enlarged fragmentary sectional view on the line 3—3 of Figure 2.

As shown on the drawings:

The subject chosen for illustrating the scheme of this invention comprises a stereographic picture 10 of a bathing girl; the stereogram resting at an angle to the floor 11 and leaning against the rear wall 12 of a store window, the glass of which is indicated at 13. Because of the inclined position of the stereogram a type of printing producing angular levitation of the observed image was chosen to bring the observed image into a vertical plane to avoid distorted perspective, as is indicated by the dotted outline 14 in the figure. The method of accomplishing angular levitation of the observed image is the subject of my application, Serial No. 736,269 filed of even date herewith and will therefore be but briefly described herein.

In stereoscopic pictures of the type known commercially as Macyart pictures; stereoscopic views of an object are taken and the two images printed in preferably nearly complementary colors such for example, as red and blue or green. The two images are superimposed on the printing surface in angular relationship; a common reference line in the two images intersecting at a point where the observed image is desired in the plane of the printing with the lines diverging to cause various points of the observed image to appear out of the plane of the surface or background in proportion to the distance of the points from the intersection of the reference lines. To bring out the stereoscopic effect of such a picture it is necessary to use the same complementary colors in an eye-screen or color-filter. If the images are printed in red and blue, similar colors are used in the eye-screens as for example red for the left eye and blue for the right eye. The effect of such color-screens is to obscure the image of the same color. With such stereograms, arranging the right eye view to the left of its complement in the printed picture, produces an image apparently forward of the reference plane of the actual printed surface, and to the rear of the plane when the images are transposed.

Inasmuch as the type of stereogram described herein requires the use of color-screens or filters for proper vision, it has heretofore been considered impractical to display such pictures to the general public as by placing them on exhibit in show windows since the pictures are unattractive and convey no meaning to an observer not equipped with the proper color-filters or eye-screens. Where eye-screens alone are provided on the window, they are unattractive and have no attention-compelling power, as well as not indicating their proper use or the objects that may be viewed therethrough. They therefore have very little secondary advertising value because they do not, when alone, intrigue the interest of the passer-by.

To overcome this disadvantage, posters 15 and 16 may be secured to the window glass 13 in locations permitting proper view by people of varying stature. These posters are provided with one or several pairs of color-screens in the colors used in printing the stereogram. Figure 2 illustrates an individual poster 15 attractively decorated in keeping with the subject on exhibit. The word "Look" may be used to this end with the centers of the letters "o" cut out, and transparent color-screens 17 inserted therein.

In order to avoid the unsightly spots of glue ordinarily necessary to secure such posters to the surface of the glass, apertures 18 are provided in the posters and stickers 20 are applied to the back of the posters and pressed into the apertures to make contact with the surface of the glass.

The poster 16 bearing several pairs of color-screens 17 may be decorated with sketches or indicia as indicated in the drawing, preferably involving subject matter pertinent to the objects illustrated by the display. It is desirable to arrange such posters with a plurality of levels of eye-screens to provide for the varying heights of observers.

It will be evident that several stereograms may be grouped in one window without excluding other exhibits arranged outside the lines of sight between the eye-screens and the illustrations, thus permitting the exhibit of actual objects together with stereograms disclosing the general fit and style of the objects.

I am aware the numerous details of construction may be varied through a wide range without departing from the principles of this invention, and I therefore do not purpose limiting the patent granted otherwise than necessitated by the prior art.

I claim as my invention:

1. An advertising display, comprising a primary stereoscopic display mounted in the interior of a show window, a secondary display on the window glass suggesting the primary display, and color-screens in said secondary display through which said primary display is to be viewed.

2. A show window display of stereoscopic illustrations, comprising a primary stereoscopic display mounted in the interior of a show window, attention-attracting posters mounted on the window glass, and eye screens embodied in said posters through which the illustrations must be viewed to obtain the stereoscopic effect thereof.

In testimony whereof I have hereunto subscribed my name.

ALFRED J. MACY.